Sept. 28, 1971  E. N. CUFF  3,608,368
INSTRUMENT FOR INDICATING HORSEPOWER OUTPUT OF AN ENGINE
Filed June 16, 1969
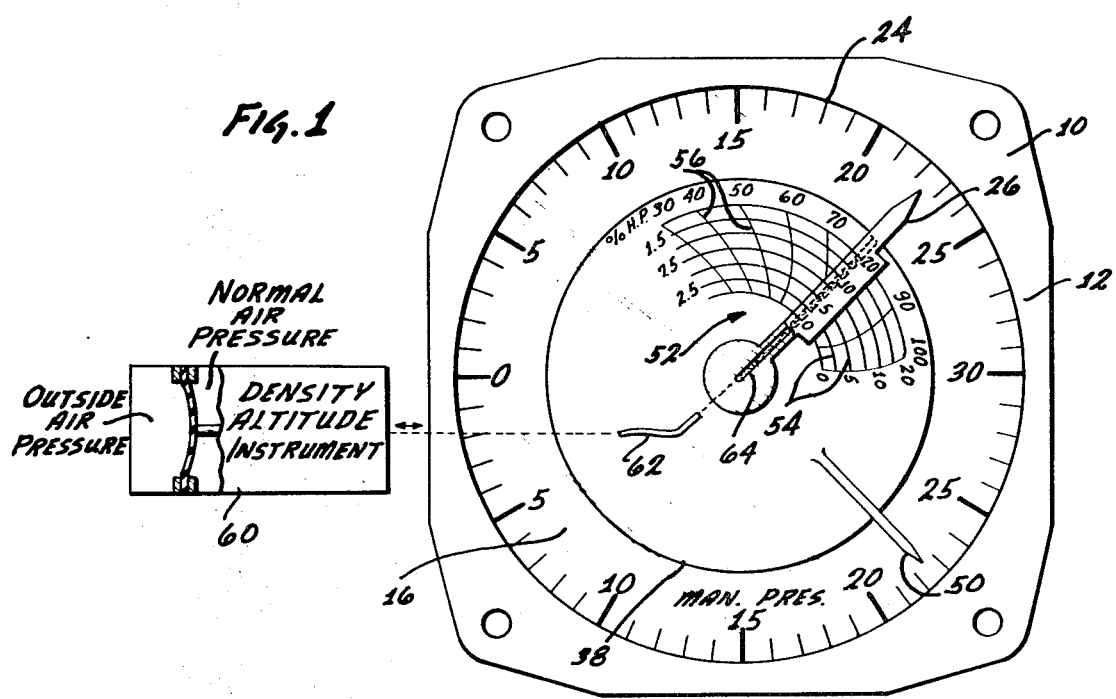
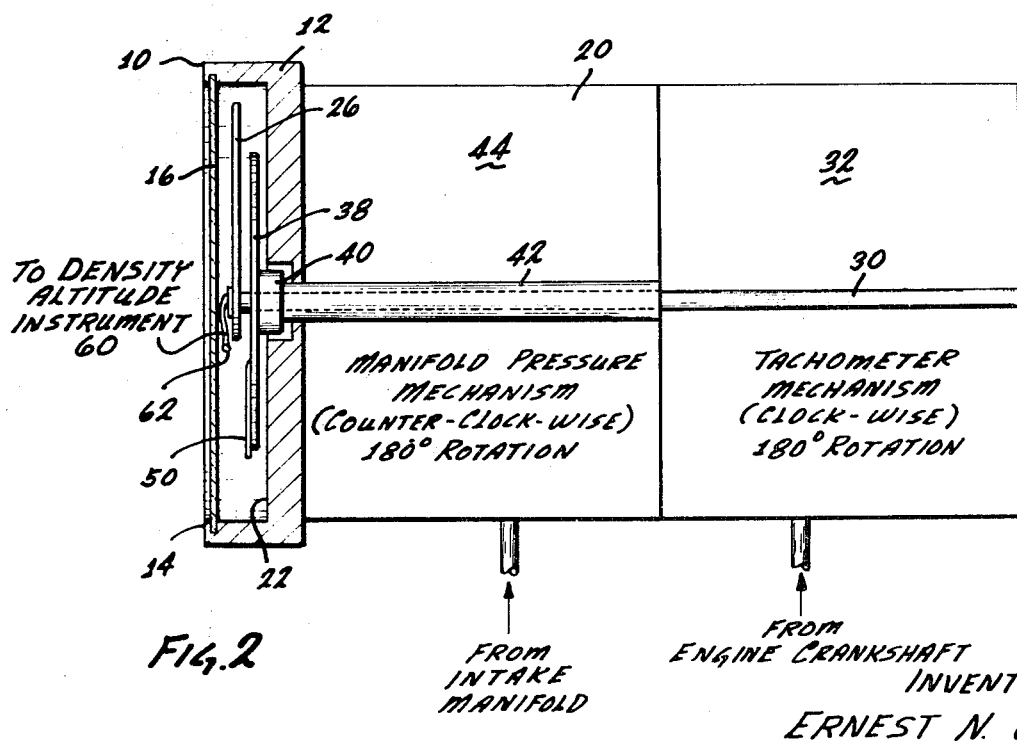
INVENTOR
ERNEST N. CUFF
BY Herzig & Walsh
ATTORNEYS United States Patent Office 3,608,368
Patented Sept. 28, 1971

3,608,368
INSTRUMENT FOR INDICATING HORSEPOWER
OUTPUT OF AN ENGINE
Ernest N. Cuff, 451 Cedar Crest Ave.,
Claremont, Calif. 91711
Filed June 16, 1969, Ser. No. 833,379
Int. Cl. G01m 15/00
U.S. Cl. 73—117.3                                  4 Claims

ABSTRACT OF THE DISCLOSURE

The invention is an instrument for indicating horsepower output of an engine particularly an aircraft engine in response to speed of the engine, manifold intake pressure and density altitude. The instrument is of a dial type with an indicating pointer which moves over a graduated chart scale on the dial so that percentage horsepower can be read directly.

SUMMARY OF THE INVENTION

The invention is an indicating instrument for directly indicating horsepower output of an engine. The invention is particularly applicable but not limited to use with aircraft engines. A specific embodiment of the invention is described herein as adapted for use in an aircraft engine.

In the operation of aircraft in addition to many other instruments that are available to the pilot, it is desirable and there is a need for a direct reading instrument that will indicate directly to the pilot the horsepower output of the engine. It is particularly desirable that the horsepower output be indicated as a percentage of the full power of the engine. It can be readily understood why this indication is very important to a pilot since it could be an indication to him that could mean the difference between having and not having a fatal crash. The normal output of the engine may diminish without being readily noticable to the pilot from other instruments such as the tachometer and this may be extremely significant if the aircraft is in a particular evolution or maneuver which could bring about a stall or spin as a result of diminished power. For example the aircraft might be in an attitude known to the pilot from other instruments, which would normally be perfectly safe but which is unsafe with diminished power not readily apparent from other indicating instruments. Thus with an instrument which directly indicates percentage of full developed horsepower the pilot is always fully aware of the percentage of total power that the engine is developing so that in any position or attitude of the aircraft he is warned of danger stemmnig from reduced power. An instrument of this nature is also extremely valuable as a safety device to less experienced pilots not having the skill to be able to recognize diminished power output from other indications. For such pilots the instrument serves as a continuous safety device capable of indicating directly to them at all times whether or not the power output of the engine is at a safe level and not below a level at which a stall or spin could occur.

Continuous operation at a combination of r.p.m. and manifold pressure which produces excessive power will result in permanent engine damage. The herein invention facilitates avoiding this. It is also useful in selecting r.p.m. and manifold pressure suitable for obtaining the desired operating horsepower to meet the specific needs of the flight (i.e.) higher power results in greater speed, but lower gasoline mileage; lower power settings result in lower speed, but better gasoline mileage.

In the light of the foregoing the primary object of the invention is to make available a simplified direct reading instrument for indicating percentage horsepower output of an engine particularly adapted to, but not limited to aircraft engines.

Another object is to provide a simplified dial type instrument having a pointer that moves over a dial, the pointer and dial being movable in response to engine speed and intake manifold pressure, to indicate horsepower.

Another object is to provide an instrument of this type responsive to another variable in addition to the engine speed and intake manifold pressure which is the density altitude measurable by a barometric aneroid, or other type instrument responsive to atmospheric pressure.

Another object is to provide an instrument of the type described wherein the dial has inscribed thereon a graduated chart including horsepower curves associated with a scale of density altitude so that the instrument can read the percentage horsepower at any altitude.

Further objects and additional advantages of the invention will become apparent from the following detailed description and annexed drawings, wherein;

FIG. 1 is a plan or face view of a preferred form of instrument;

FIG. 2 is a longitudinal sectional view through the instrument.

Referring now to the figures of the drawings numeral 10 designates the end face of a preferred form of the instrument adapted to be panel mounted. The end of the instrument is in the form of a cylindrical housing 12 having an edge bezel 14 in which is mounted a glass face 16. The end housing 12 is at the end of a rear housing or casing 20.

Inscribed on the inside bottom face 22 of the housing 12 is a circular dial or scale the upper half of which is graduated as shown in FIG. 1 in hundreds of revolutions per minute. Movable relative to this graduated dial or scale is a pointer 26 on a shaft 30. The shaft 30 extends back into the rear part of the housing 20 as designated at 32 and in this part of the housing is a conventional tachometer mechanism capable of measuring and indicating revolutions per minute of the crankshaft of the engine. This mechanism is of a known and conventional type.

Concentric with the axis of the housing 12 and 20 is a disc or dial 38 which has a hub 40 as may be seen in FIG. 2 on a shaft 42 which is coaxial with the shaft 30, the shaft 30 being telescoped within the shaft 42. The shaft 42 extends into a part 44 of the housing 20. Provided in the housing part 44 is conventional mechanism responsive to the manifold pressure and connected by linkages to shaft 42 so that the dial 38 is rotated proportionately to the manifold pressure. This mechanism may be of a Bourdon tube, diaphragm or other well known type.

Mounted also on shaft 42 or attached to the dial 38 is another pointer 50. The lower half of the dial or scale 24 is graduated from left to right around the lower half from zero to 30 has shown to read the manifold pressure in inches of mercury which would be from zero to 30 inches. Thus as may be seen, the dial and the pointer 50 move angularly in response to manifold pressure as read by the mechanism in the housing 44.

Inscribed on the dial 38 is a graduated scale or chart which pointer 26 moves over as indicated at 52. This scale comprises a plurality of concentric arcs of circles as designated by numeral 54, each of which represents a different density altitude. Traversing the concentric density altitude arcs 54 are curves as designated at 56 each of which is indicative of a percentage horsepower as indicated on FIG. 1, the outer ends of these curves being spaced apart with the percentage horsepower inscribed on the dial 38. The concentric arcs 54 are graduated outwardly radially in thousands of feet from zero altitude outwardly to 20 thousand feet. Preferably pointer 26 has provided along its length a scale graduated as shown numerically from zero to 20 each unit of the scale representing a thousand feet of altitude.

Percentage horsepower can be read directly from the instrument as shown in FIG. 1 as will be described in detail hereinafter, the density altitude being read from a separate instrument, and then with this reading on the scale on the pointer 26, the percentage horsepower can be read at the intersection of one of the curved horsepower curves as inscribed on the dial, or a curve interpolated between the inscribed curves that is, at the point of intersection of this curve with a point on the scale on pointer 26 representative of the density altitude.

In a preferred form of the invention the instrument is made to respond automatically to the additional variable, that is, the density altitude. In FIG. 1 numeral 60 designates a density altitude instrument which may be typical of conventional instruments of the barometric or aneroid type which respond to atmospheric pressure and is capable accordingly of indicating altitude above sea level. In FIG. 1 this instrument is connected by a tube 62 to a further tube 64 extending along the length of the pointer 26, this part of the tube being visible. The tube contains mercury which is visible through the glass tube and it extends along the length of the pointer an amount indicative of the atmospheric pressure, and accordingly the density altitude. Thus in reading the instrument the mercury indicates a point along the scale on pointer 26 and the instrument is read by reading this point on one of the horsepower curves, that is one actual inscribed, or one interpolated between the inscribed curves, the reading being the point of intersection as between a horsepower curve and one of the arcs 54 which passes through the point indicated by the mercury column.

With respect to the actuation of the instrument it is of course well known that with respect to an internal combustion engine, the two variables, speed of the engine and intake manifold pressure, together make possible a sufficiently accurate indication of horsepower output. In connection with aircraft engines of course the third variable becomes significant, that is, the density altitude. At higher altitudes the air is thinner, that is, less dense and the power output of the engine in relation to manifold intake pressure will vary accordingly. These circumstances are accommodated by the calibrations, that is, the chart having curves as designated at 52 inscribed on the dial 38. Horsepower can of course be calculated for ranges of speed and intake manifold pressures and plotted or charted as indicated on FIG. 1 on dial 38, the instrument being calibrated as described to read the horsepower directly. With respect to the variable, that is, density altitude the curves 56 are provided to accommodate for variation in horsepower in accordance with density altitude at the same speed and manifold pressure.

From the foregoing those skilled in the art will readily understand the nature of the invention and the manner in which it achieves and realizes the objects and advantages as set forth in the foregoing, as well as the many additional advantages that are apparent from the detailed description.

The foregoing disclosure is representative of preferred forms of the invention, and is to be interpreted in an illustrative rather than a limiting sense, the invention to be accorded the full scope of the claims appended hereto.

What is claimed is:

1. An instrument for indicating power output of engines in response to variables comprising means reponsive to speed of the engine, means responsive to intake manifold pressure of the engine, means calibrated to be indicative of horsepower output of the engine in accordance with said variables, one of said responsive means comprising a rotatable dial having graduations thereon and the other of said responsive means comprising a pointer movable adjacent to said graduated dial, said graduations on said dial comprising horsepower curves, said pointer being provided with indication means responsive to and representative of density altitude whereby horsepower can be indicated for a specific density altitude.

2. An instrument for indicating power output of engines in response to variables comprising means responsive to speed of the engine, means responsive to intake manifold pressure of the engine, means calibrated to be indicative of horsepower output of the engine in accordance with said variables, means responsive to density altitude and means providing connection from the speed, intake manifold pressure, and density altitude responsive means to the calibrated means so that a reading of horsepower can be taken from the instrument for specific density altitude.

3. An instrument as in claim 2 wherein said means responsive to density altitude includes a pointer combined with a scale whereby to give an indication on the scale along the length of the said pointer.

4. An instrument as in claim 3, wherein said pointer includes a tube containing fluid movable therein to indicate density altitude.

References Cited
UNITED STATES PATENTS

| | | | |
|---|---|---|---|
| 1,401,315 | 12/1921 | Clark | 73—114 |
| 3,135,110 | 6/1964 | Bedard et al. | 73—115 |
| 3,446,070 | 5/1969 | Hickox | 116—136.5 |

JERRY W. MYRACLE, Primary Examiner

U.S. Cl. X.R.

73—115; 116—136.5